US012567909B2

(12) United States Patent
Shi et al.

(10) Patent No.: US 12,567,909 B2
(45) Date of Patent: Mar. 3, 2026

(54) COHERENT RECEIVING DEVICE AND ANEMOMETRY LIDAR SYSTEM

(71) Applicant: ACCELINK TECHNOLOGIES CO., LTD., Wuhan (CN)

(72) Inventors: Chuan Shi, Wuhan (CN); Bo Zhang, Wuhan (CN); Honggang Chen, Wuhan (CN); Xuerui Liang, Wuhan (CN); Xuanxuan Cheng, Wuhan (CN)

(73) Assignee: ACCELINK TECHNOLOGIES CO., LTD., Wuhan (CN)

( * ) Notice: Subject to any disclaimer, the term of this patent is extended or adjusted under 35 U.S.C. 154(b) by 342 days.

(21) Appl. No.: 18/252,355

(22) PCT Filed: Dec. 10, 2020

(86) PCT No.: PCT/CN2020/135327
§ 371 (c)(1),
(2) Date: May 9, 2023

(87) PCT Pub. No.: WO2022/099838
PCT Pub. Date: May 19, 2022

(65) Prior Publication Data
US 2024/0007194 A1      Jan. 4, 2024

(30) Foreign Application Priority Data

Nov. 11, 2020    (CN) .......................... 202011258199.X

(51) Int. Cl.
*H04B 10/61*          (2013.01)
*G01P 5/26*          (2006.01)
(Continued)

(52) U.S. Cl.
CPC .............. *H04B 10/614* (2013.01); *G01P 5/26* (2013.01); *G01S 7/4917* (2013.01); *G01S 7/499* (2013.01);
(Continued)

(58) Field of Classification Search
None
See application file for complete search history.

(56) References Cited

U.S. PATENT DOCUMENTS 5,237,442 A * 8/1993 Khoe ..................... H04B 10/64
                                                                       359/638
5,272,512 A * 12/1993 Kadowaki ............... G01S 17/58
                                                                       356/28
(Continued)

FOREIGN PATENT DOCUMENTS

CN          1932553 A  *  3/2007
CN       101825710 A      9/2010
(Continued)

OTHER PUBLICATIONS

Lombard et al., "Eyesafe Coherent Detection Wind Lidar Based on a Beam-Combined Pulsed Laser Source", Optics Letters, Optical Society of America, Mar. 15, 2015, vol. 40, No. 6, pp. 1030-1033. (Year: 2015).*

(Continued)

*Primary Examiner* — Vladimir Magloire
*Assistant Examiner* — Ashley Brown Raynal
(74) *Attorney, Agent, or Firm* — Knobbe Martens Olson & Bear LLP

(57) ABSTRACT

A coherent receiving device and anemometry lidar system. The device includes: a polarization maintaining optical fiber pin for receiving local oscillation light and outputting it to frequency mixer; a polarization beam splitting prism for receiving signal light, splitting it into first and second signal light, and outputting them to the frequency mixer; the frequency mixer for mixing the first and second signal light with the local oscillation light and outputting the mixed light to PD array; the PD array for converting the mixed light to differential current signal; and a signal processing circuit for converting the differential current signal to differential volt-
(Continued)

age signal whose derivation formula includes part of frequency difference between the signal light and local oscillation light, detecting a frequency of the differential voltage signal to obtain a value of the frequency difference, and obtaining Doppler frequency shift amount of the signal light according to the value.

12 Claims, 4 Drawing Sheets

(51) Int. Cl.

| | |
|---|---|
| *G01S 7/4912* | (2020.01) |
| *G01S 7/499* | (2006.01) |
| *G01S 17/58* | (2006.01) |
| *G01S 17/95* | (2006.01) |

(52) U.S. Cl.
CPC .............. *G01S 17/58* (2013.01); *G01S 17/95* (2013.01); *H04B 10/616* (2013.01)

(56) References Cited

U.S. PATENT DOCUMENTS

| | | | | |
|---|---|---|---|---|
| 5,272,513 | A * | 12/1993 | Vahala | .................... G01S 17/58 356/28 |
| 7,826,752 | B1 | 11/2010 | Zanoni et al. | |
| 2006/0227317 | A1 | 10/2006 | Henderson et al. | |
| 2007/0040730 | A1 * | 2/2007 | Schlotterbeck | ......... G01S 17/88 342/104 |
| 2015/0258990 | A1 * | 9/2015 | Stettner | ................. G01S 7/4813 701/1 |
| 2016/0202283 | A1 * | 7/2016 | Wang | .................... G01S 7/4814 356/28 |
| 2017/0134097 | A1 | 5/2017 | Morie | |

FOREIGN PATENT DOCUMENTS

| | | | | | |
|---|---|---|---|---|---|
| CN | 101825713 | A | * | 9/2010 | |
| CN | 106471757 | A | | 3/2017 | |
| CN | 106932785 | A | | 7/2017 | |
| CN | 106940444 | A | | 7/2017 | |
| CN | 110531378 | A | * | 12/2019 | ............. G01S 17/95 |
| CN | 111525962 | A | | 8/2020 | |
| CN | 111628827 | A | * | 9/2020 | ......... H04B 10/6151 |
| WO | WO 2016/111861 | A1 | | 7/2016 | |

OTHER PUBLICATIONS

International Search Report issued in International Application No. PCT/CN2020/135327, dated Jul. 26, 2021.

Peng, C. "Research on dual-balanced heterodyne detection of 2μm coherent lidar for wind measurement", Basic Sciences, Chinese Master's Theses Full-Text Database, Mar. 15, 2016, No. 3, in 10 pages.

Search Report issued in Chinese Application No. 202011258199.X, dated Jul. 14, 2021.

Written Opinion issued in International Application No. PCT/CN2020/135327, dated Jul. 26, 2021.

Extended European Search Report issued in European Patent Application No. 20961392.6, dated Aug. 29, 2024.

Lombard et al., "Eyesafe Coherent Detection Wind Lidar Based on a Beam-Combined Pulsed Laser Source", Optics Letters, Optical Society of America, Mar. 15, 2015, vol. 40, No. 6, pp. 1030-1033.

* cited by examiner

Signal light

Local oscillation light

COHERENT RECEIVING DEVICE AND ANEMOMETRY LIDAR SYSTEM

CROSS-REFERENCE TO RELATED APPLICATION(S)

The present disclosure claims the priority of a Chinese patent application with application No. 202011258199.X filed on Nov. 11, 2020, the disclosure of which is hereby incorporated by reference herein in its entirety.

TECHNICAL FIELD OF THE DISCLOSURE

The present disclosure relates to a technical field of optical communication, and in particular, to a coherent receiving device and an anemometry lidar system.

BACKGROUND

An Anemometry Doppler lidar is a high-precision and high-resolution atmospheric wind field detection technology. It is widely used in the fields, such as atmospheric dynamics research, weather forecast and atmospheric environment monitoring and the like. The traditional Doppler frequency shift detection method involves an edge detection technology and a stripe imaging technology. An interference pattern of annular stripes or linear stripes mainly generated by a Fabry-Perot resonant cavity, a Mach-Zehnder interferometer, a Fizeau interferometer, and the like, is used to convert a frequency variation of a signal into a variation of relative energy so as to determine the Doppler frequency shift. Such frequency shift detection method generally requires the use of a planar charge-coupled device (CCD) to receive the interference pattern. However, the planar CCD is larger in volume, the energy of echo signal received through this method is usually weak, and the detected energy is also weak. This energy will be affected by a system noise, and thus it may cause a certain error to Doppler shift detection.

SUMMARY

In view of the above, in order to solve at least one problem in the prior art, embodiments of the present disclosure provide a coherent receiving device and an anemometry lidar system.

In order to achieve the above-mentioned object, the technical solutions of the embodiments of the present disclosure are realized as follows.

In a first aspect, the embodiments of the present disclosure provide a coherent receiving device. The coherent receiving device comprises: a polarization maintaining optical fiber pin, a polarization beam splitting prism, a frequency mixer, a photodiode (PD) array and a signal processing circuit; wherein the polarization maintaining optical fiber pin is configured to receive local oscillation light and output the local oscillation light to the frequency mixer, and a polarization state is kept unchanged when the local oscillation light is transmitted in the polarization maintaining optical fiber pin;

the polarization beam splitting prism is configured to receive signal light, split the signal light into first signal light with a p polarization state and second signal light with an s polarization state, and output the first signal light and the second signal light to the frequency mixer;

the frequency mixer is configured to mix the first signal light and the second signal light with the local oscillation light, respectively, and output mixed light to the PD array;

the PD array is configured to perform a photoelectric conversion on the mixed light to obtain a differential current signal;

the signal processing circuit is configured to convert the differential current signal so as to obtain a differential voltage signal, wherein a derivation formula of the differential voltage signal comprises a part of a frequency difference between the signal light and the local oscillation light; detect a frequency of the differential voltage signal so as to obtain a value of the frequency difference between the signal light and the local oscillation light, and obtain a Doppler frequency shift amount of the signal light according to the value of the frequency difference between the signal light and the local oscillation light.

In an optional embodiment, the signal processing circuit comprises an amplifier module, an analog-to-digital converter, and a processor; wherein the amplifier module is configured to amplify the differential current signal and convert the differential current signal into the differential voltage signal;

the analog-to-digital converter is configured to make the analog-to-digital converter ADC sample the differential voltage signal to obtain an ADC sampling signal; and the processor is configured to process the ADC sampling signal to obtain a frequency of the ADC sampling signal, and the frequency of the ADC sampling signal is the Doppler frequency shift amount of the signal light.

In an optional embodiment, the derivation formula of the differential voltage signal is $$X_I = R \times G \times \sqrt{\frac{P_{in} \times (\cos\delta)^2 \times P_{lo}}{2}} \cos((\omega_{in} - \omega_{lo}) \times t + \theta_{in} - \theta_{lo}) \text{ and}$$

$$X_Q = R \times G \times \sqrt{\frac{P_{in} \times (\cos\delta)^2 \times P_{lo}}{2}} \sin((\omega_{in} - \omega_{lo}) \times t + \theta_{in} - \theta_{lo});$$

where R is responsivity of photodiodes in the PD array, G is a trans-impedance gain of the amplifier module, $P_{in}$ is an optical intensity of the signal light optical, $P_{lo}$ is an optical intensity of the local oscillation light; $\omega_{in}$ is an angle frequency of the signal light, $\omega_{lo}$ is an angle frequency of the local oscillation light; $\theta_{in}$ is an initial phase of the signal light, $\theta_{lo}$ is an initial phase of the local oscillation light, δ is an included angle between the first signal light and a horizontal direction or an included angle between the second signal light and the horizontal direction;

the frequency of the differential voltage signal is detected so as to determine a value of item $(\omega_{in}-\omega_{lo}) \times t$ in the derivation formula of the differential voltage signal; and the value of item $(\omega_{in}-\omega_{lo}) \times t$ in the derivation formula of the differential voltage signal is the Doppler frequency shift amount of the signal light.

In an optional embodiment, the amplifier module uses a low-bandwidth amplifier, and is also configured to realize high-frequency filtering to the differential current signal.

In an optional embodiment, the Doppler frequency shift amount of the signal light is used for determining a wind speed.

In an optional embodiment, the device further comprises a low-frequency filter circuit set between the PD array and the amplifier module, wherein the low-frequency filter circuit is configured to control a cut-off frequency of the differential current signal so as to realize low-frequency filtering to the differential current signal.

In an optional embodiment, the signal light is generated based on a following manner, that is, a laser emitted by a laser device enters an atmosphere and interacts with aerosol molecules in the atmosphere to generate an echo signal which is the signal light.

In an optional embodiment, the local oscillation light is a laser entered into the polarization maintaining optical fiber pin emitted by a laser device.

In an optional embodiment, the frequency mixer comprises a first sub-frequency mixer and a second sub-frequency mixer, wherein the first sub-frequency mixer is configured to mix the first signal light and the local oscillation light; and the second sub-frequency mixer is configured to mix the second signal light and the local oscillation light.

In an optional embodiment, the device further comprises a reflecting prism and a lens array set between the frequency mixer and the PD array;

wherein the mixed light output by the frequency mixer is reflected by the reflecting prism and converged by the lens array and then output to the PD array.

In an optional embodiment, the device further comprises two C lenses set between the polarization beam splitting prism and the frequency mixer;

wherein the first signal light and the second signal light both output by the polarization beam splitting prism are respectively converged into the frequency mixer through the two C lenses.

In a second aspect, the embodiments of the present disclosure provide an anemometry lidar system, comprising: a coherent receiving device as described in the first aspect, a laser unit and a telescopic system; wherein the laser unit is configured to emit a laser, and split the laser into a first part of the laser and a second part of the laser; output the first part of the laser to the telescopic system, and output the second part of the laser to the coherent receiving device;

the telescopic system is configured to emit the first part of laser into an atmosphere, receive an echo signal interacting with aerosol molecules in the atmosphere, and output the echo signal to the coherent receiving device; and the coherent receiving device is configured to receive the second part of the laser as local oscillation light, interfere the local oscillation light with the echo signal to form a demodulation signal, obtain a Doppler frequency shift amount of the echo signal through the demodulation signal, and determine a wind speed according to the Doppler frequency shift amount.

In an optional embodiment, the laser unit comprises a laser device and a beam splitter, wherein the laser device is configured to emit the laser; and the beam splitter is split the laser into the first part of the laser with first energy and the second part of the laser with second energy, wherein the first energy is smaller than the second energy.

The embodiments of the present disclosure disclose a coherent receiving device and an anemometry lidar system. The coherent receiving device comprises a polarization maintaining optical fiber pin, a polarization beam splitting prism, a frequency mixer, a photodiode PD array and a signal processing circuit; wherein the polarization maintaining optical fiber pin is configured to receive local oscillation light and output the local oscillation light to the frequency mixer, and a polarization state is kept unchanged when the local polarization light is transmitted in the polarization maintaining optical fiber pin; the polarization beam splitting prism is configured to receive signal light, split the signal light into first signal light with a p polarization state and second signal light with an s polarization state, and output the first signal light and the second signal light to the frequency mixer; the frequency mixer is configured to mix the first signal light and the second signal light with the local oscillation light, respectively, and output the mixed light to the PD array; the PD array is configured to perform a photoelectric conversion on the mixed light to obtain a differential current signal; and the signal processing circuit is configured to convert the differential current signal so as to obtain a differential voltage signal, wherein a derivation formula of the differential voltage signal comprises a part of a frequency difference between the signal light and the local oscillation light; detect a frequency of the differential voltage signal so as to obtain a value of the frequency difference between the signal light and the local oscillation light, and determine a Doppler frequency shift amount of the signal light according to the value of the frequency difference between the signal light and the local oscillation light. The coherent receiving device in the embodiments of the present disclosure performs the Doppler frequency detection by using the interference between the local oscillation light and the signal light, and uses a differential signal output mode, which is capable of eliminating the common-mode noise and improving the detection precision, and the Doppler frequency shift detection is not affected by the laser wavelength drift, and moreover, the coherent receiving device uses a dual-polarization detection scheme, whereby the Doppler frequency shift of the signal light can be effectively detected even if the signal light changes the polarization direction.

DETAILED DESCRIPTION

Figures 1, 2:
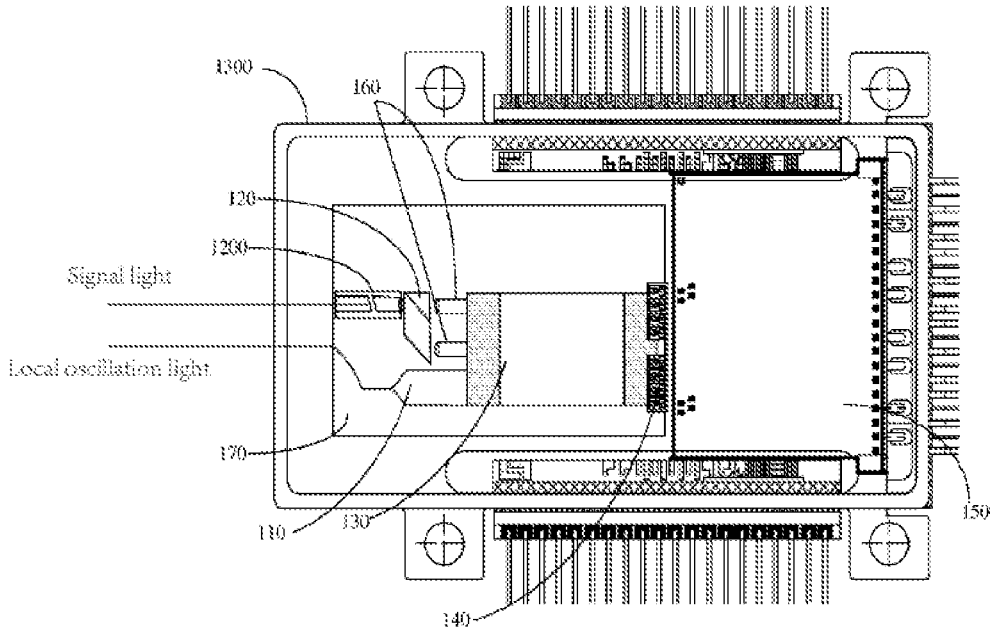
FIG. 1 is a structural schematic diagram of a coherent receiving device provided by an embodiment of the present disclosure.
FIG. 2 is a schematic diagram of a steering structure between a frequency mixer and a PD array provided by an embodiment of the present disclosure.

Exemplary embodiments as disclosed in the present disclosure will be described in more detail below with reference to the accompanying drawings. Although exemplary embodiments of the present disclosure are shown in the accompanying drawings, it should be understood that the present disclosure may be implemented in various forms and should not be limited by the specific embodiments set forth herein. Rather, these embodiments are provided to be able to thoroughly understand the present disclosure, and may fully convey the scope of the present disclosure to those skilled in the art.

In the following description, numerous specific details are provided in order to provide a more thorough understanding of the present disclosure. However, it will be apparent for those skilled in the art that the present disclosure may be implemented without one or more of these details. In other examples, in order to avoid confusion with the present disclosure, some technical features well known in the art are not described; that is, not all features of an actual embodiment are described herein, and well-known functions and structures are not described in detail.

In the accompanying drawings, the dimensions of layers, regions, and elements, and their relative dimensions may be exaggerated for clarity. The same reference signs throughout refer to the same elements.

It should be understood that spatial relationship terms such as "under", "underneath", "lower", "below", "above", "upper", etc. may be used herein for convenience of description to describe the relationship between one element or one feature to other elements or features shown in the figures. It should be understood that the spatial relative terms are intended to include different orientations of the device in use and operation in addition to the orientation shown in the figures. For example, if the devices in the figures are turned over, then the elements or features described as "underneath" or "below" or "under" other elements would be oriented as "above" the other elements or features. Thus, the exemplary terms "underneath" and "under" may include both an orientation of the above and that of the below. The device may be otherwise oriented (rotated 90 degrees or other orientations) and the spatial descriptors used herein are interpreted accordingly.

The terminology used herein is for the purpose of describing embodiments only and is not intended to limit the present disclosure. As used herein, the singular forms "a," "an," and "the/said" are intended to include the plural forms as well, unless it clearly indicates otherwise in the context. It should also be understood that the terms "compose" and/or "comprise", when used in the present description, identify the presence of the described features, integers, steps, operations, elements and/or components, but do not exclude the presence or addition of one or more other features, integers, steps, operations, elements, components and/or groups. As used herein, the term "and/or" includes any and all combinations of the associated listed items.

FIG. 1 is a structural schematic diagram of a coherent receiving device provided by an embodiment of the present disclosure. As shown in FIG. 1, the coherent receiving device comprises: a polarization maintaining optical fiber pin 110, a polarization beam splitting prism 120, a frequency mixer 130, a photodiode (Photo-Diode, PD) array 140 and a signal processing circuit 150; wherein the polarization maintaining optical fiber pin 110 is used for receiving local oscillation light and outputting the local oscillation light to the frequency mixer 130, and the polarization state is kept unchanged when the local polarization light is transmitted in the polarization maintaining optical fiber pin 110;

the polarization beam splitting prism 120 is used for receiving signal light, splitting the signal light into first signal light with a p polarization state and second signal light with an s polarization state, and outputting the first signal light and the second signal light to the frequency mixer 130;

the frequency mixer 130 is used for mixing the first signal light and the second signal light with the local oscillation light, respectively, and outputting the mixed light to the PD array 140;

the PD array 140 is used for performing photoelectric conversion on the mixed light to obtain a differential current signal; and the signal processing circuit 150 is used for converting the differential current signal so as to obtain a differential voltage signal, wherein a derivation formula of the differential voltage signal comprises a part of a frequency difference between the signal light and the local oscillation light; detecting a frequency of the differential voltage signal so as to obtain a value of the frequency difference between the signal light and the local oscillation light, and obtaining a Doppler frequency shift amount of the signal light according to the value of the frequency difference between the signal light and the local oscillation light.

In the embodiments of the present disclosure, the coherent receiving device has two input light: one is signal light, and the other is local oscillation light. The signal light and the local oscillation light both are a laser generated by the same laser device. The signal light is generated based on the following mode: the laser emitted by the laser device enters an atmosphere and interacts with aerosol molecules in the atmosphere to generate an echo signal, and the echo signal is the signal light. The local oscillation light is the laser entered into the polarization maintaining optical fiber pin 110 emitted by the laser device. The signal light is an echo signal that interacts with aerosol molecules in the atmosphere, and the polarization state thereof is uncertain; and the local oscillation light is polarized light. In an embodiment of the present disclosure, the local oscillation light is introduced into a coherent receiving device, which may improve the sensitivity of Doppler frequency shift detection, and eliminate the frequency drift caused by long-time working of the laser device or external environment change.

In an embodiment of the present disclosure, the coherent receiving device further comprises two C lenses 160 set between the polarization beam splitting prism 120 and the frequency mixer 130, wherein the first signal light and the second signal light output by the polarization beam splitting prism 120 respectively converge into the frequency mixer 130 through the two C lenses 160. In an embodiment of the present disclosure, the two C lenses 160 are directly bonded together with the frequency mixer 130, and the two C lenses 160 are used for converging the first signal light and the second signal light input into the frequency mixer 130. When the device is subjected to external impact or the external environment temperature changes, since the two C lenses 160 and the frequency mixer 130 are bonded together, the relative displacement between the two C lenses 160 and the frequency mixer 130 will not occur (i.e. the position of the two C lenses 160 and the frequency mixer 130 are changed together), that is to say, in the embodiment of the present disclosure, the setting solution of bonding the two C lenses and the frequency mixer together has better stability and temperature characteristics. And the tolerance of the optical path of the first signal light and the second signal light to the position is relatively large, and even if the position of the two C lenses 160 and the frequency mixer 130 are changed together, the influence on the coupling efficiency is also relatively small.

In an embodiment of the present disclosure, the coherent receiving device further comprises a substrate 170, wherein the polarization beam splitting prism 120, the two C lenses 160, the frequency mixer 130 and the PD array 140 are set on the substrate 170.

In an embodiment of the present disclosure, the polarization beam splitting prism 120 is composed of two prisms glued together, and the glued surfaces of the two prisms are set with polarization beam splitting films, wherein when the signal light reaches the glued surface, the first signal light (p polarization state) with the polarization state parallel to the input light and the normal plane continues to propagate forward through the polarization beam splitting film and emits the polarization beam splitting prism 120; and the second signal light (s polarization state) with the polarization state perpendicular to the input light and the normal plane is reflected and steered at the polarization beam splitting film (90-degrees), and is re-reflected and steered (90-degrees) on the inclined surface of the polarization beam splitting prism 120, thereby forming the second signal light parallel to the first signal light, and emitting the polarization beam splitting prism 120.

In an embodiment of the present disclosure, the frequency mixer 130 comprises a local oscillation port and two signal ports, wherein the local oscillation port is connected with the polarization maintaining optical fiber pin 110, and the two signal ports are respectively connected with the two C lenses 160. The polarization maintaining optical fiber pin 110 and the local oscillation port of the frequency mixer 130 can be bonded together through ultraviolet rays (Ultraviolet Rays); and the two C lenses 160 and the two signal ports of the frequency mixer 130 can be bonded and coupled together through ultraviolet rays.

In an embodiment of the present disclosure, the first signal light and the second signal light respectively are converged into the frequency mixer 130 through the two C lenses 160, and the frequency mixer 130 comprises a first sub-frequency mixer and a second sub-frequency mixer, wherein the first sub-frequency mixer is used for mixing the first signal light and the local oscillation light; and the second sub-frequency mixer is used for mixing the second signal light and the local oscillation light. The first sub-frequency mixer and the second sub-frequency mixer may be a 90-degree frequency mixer. The two polarization state light of the signal light (the first signal light and the second signal light) are provided to the PD array 140 through the frequency mixer 130 after being respectively mixed with the local oscillation light in the corresponding 90-degree frequency mixers. The two C lenses 160 are disposed on the substrate 170.

In an embodiment of the present disclosure, the signal processing circuit 150 comprises an amplifier module, an analog-to-digital converter, and a processor, wherein the amplifier module is used for amplifying the differential current signal and converting the differential current signal into a differential voltage signal; the analog-to-digital converter is used for performing analog-to-digital converter (ADC) sampling on the differential voltage signal to obtain an ADC sampling signal; the processor is used for processing the ADC sampling signal to obtain a frequency of the ADC sampling signal, and the frequency of the ADC sampling signal is just the Doppler frequency shift amount of the signal light. The wind speed can be determined according to the Doppler frequency shift amount of the signal light. In an embodiment of the present disclosure, the coherent receiving device uses a differential signal output mode, which is capable of eliminating a system common-mode noise and improving the detection precision. In some embodiments, the signal processing circuit 150 may only comprise an amplifier module, and the signal processing circuit 150 outputs the differential voltage signal amplified and converted by the amplifier module to the outside of the tube shell through a tube shell pin of the coherent receiving device, and the differential voltage signal is processed by an analog-to-digital converter and a processor outside the tube shell so as to obtain the Doppler frequency shift amount of the signal light.

In an embodiment of the present disclosure, a low-frequency filter circuit is further set between the PD array 140 and the amplifier module, and the low-frequency filter circuit is used for controlling a cut-off frequency of the differential current signal so as to realize low-frequency filtering to the differential current signal.

In an embodiment of the present disclosure, the amplifier module may use a low-bandwidth amplifier, so that it may also be used for realizing high-frequency filtering to the differential current signal. In the embodiment of the present disclosure, the differential current signal is amplified through the low-bandwidth amplifier, so that it is capable of effectively reducing 1/f noise in the circuit, and improving a signal-to-noise ratio.

In an embodiment of the present disclosure, the PD array 140 is electrically connected with the signal processing circuit 150 through a gold wire, and thus, the differential current signal output by the PD array 140 can be sent to the signal processing circuit 150 through the gold wire.

The PD array 140 is set on the substrate 170, and the photosensitive surface of the photodiode in the PD array 140 faces upwards, while the direction of the mixed light output by the frequency mixer 130 is parallel to the photosensitive surface of the photodiode, therefore, the mixed light needs to be steered and then emitted into the photosensitive surface of the photodiode in the PD array 140. FIG. 2 is a schematic diagram of a steering structure between a frequency mixer and a PD array provided by an embodiment of the present disclosure. As shown in FIG. 2, the coherent receiving device further comprises a reflecting prism 180 and a lens array 190 set between the frequency mixer 130 and the PD array 140, wherein the mixed light output by the frequency mixer 130 is reflected by the reflecting prism 180 and converged by the lens array 190 and then output to the PD array 140. The mixed light output by the frequency mixer 130 steers 90 degrees through the reflecting prism 180, and the steered optical signal is converged into the PD array 140 through the lens array 190. In some embodiments, two sides of the PD array 140 are set with a lens bracket 1100, and the lens bracket 1100 is used for fixing the lens array 190, so that the center of the light-transmitting surface of the lens array 190 is aligned with the center of the photosensitive surface of the PD array 140. The lens bracket 1100 is set on the substrate 170.

In an embodiment of the present disclosure, the coherent receiving device further comprises a collimator 1200, wherein the collimator 1200 is used for collimating the signal light input into the coherent receiving device and outputting the collimated signal light to the polarization beam splitting prism 120. The collimator 1200 is also set on the substrate 170.

In an embodiment of the present disclosure, the coherent receiving device further comprises a tube shell 1300, wherein the substrate 170 and the signal processing circuit 150 are set within the tube shell 1300. It should be noted that the devices set on the substrate 170 are also located in the tube shell 1300.

Figure 3:
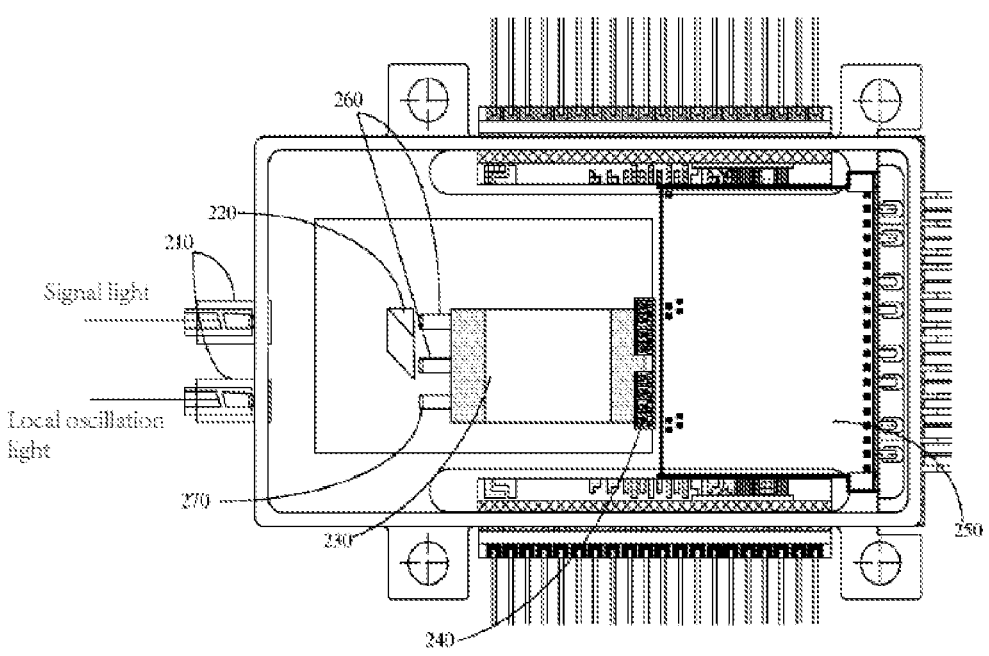
FIG. 3 is a structural schematic diagram of another coherent receiving device provided by an embodiment of the present disclosure.

In another embodiment of the present disclosure, the coherent receiving device may further set a light window and then a collimator in the light window, thereby inputting the collimated signal light and the local oscillation light into the coherent receiving device. FIG. 3 is a structural schematic diagram of another coherent receiving device provided by an embodiment of the present disclosure. As shown in FIG. 3, the coherent receiving device comprises: a light window 210, a polarization beam splitting prism 220, a frequency mixer 230, a PD array 240 and a signal processing circuit 250; wherein the light window 210 is used for receiving local oscillation light and signal light, and outputting the local oscillation light to the frequency mixer 230, the signal light to the polarization beam splitting prism 220;

the polarization beam splitting prism 220 is used for receiving the signal light, splitting the signal light into first signal light with a p polarization state and second signal light with an s polarization state, and outputting the first signal light and the second signal light to the frequency mixer 230;

the frequency mixer 230 is used for mixing the first signal light and the second signal light with the local oscillation light, respectively, and outputting the mixed light to the PD array 240;

the PD array 240 is used for performing photoelectric conversion on the mixed light to obtain a differential current signal; and The signal processing circuit 250 is used for processing the differential current signal so as to obtain a Doppler frequency shift amount of the signal light.

In an embodiment of the present disclosure, the coherent receiving device further comprises two C lenses 260 set between the polarization beam splitting prism 220 and the frequency mixer 230, wherein the first signal light and the second signal light output by the polarization beam splitting prism 220 are respectively converged into the frequency mixer 240 through the two C lenses 260.

In an embodiment of the present disclosure, the coherent receiving device further comprises a C lens 270 set between the light window 210 and the frequency mixer 230, wherein the local oscillation light output by the light window 210 is converged into the frequency mixer 240 through the C lens 270.

Figure 4:
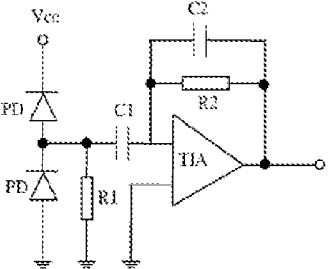
FIG. 4 is a schematic diagram of a connection structure between a PD array and an amplifier module provided by an embodiment of the present disclosure.

FIG. 4 is a schematic diagram of a connection structure between a PD array and an amplifier module provided by an embodiment of the present disclosure. As shown in FIG. 4, every two PD devices in the PD array are connected with a low-bandwidth amplifier TIA, and the two PD devices are connected in series, one end being connected with VCC, and the other end being grounded, where the VCC provides a reverse bias voltage for the PD device. The amplifier module is composed of the low-bandwidth amplifier TIA, and a resistor R2 and a capacitor C2 which are connected in parallel with the low-bandwidth amplifier TIA, and by adjusting the values of R2 and C2, the gain and the bandwidth of the low-bandwidth amplifier TIA can be controlled, so that the filtering range of the low-bandwidth amplifier TIA can be controlled. A low-frequency filter circuit is set between the PD array and the low-bandwidth amplifier TIA, and is composed of a resistor R1 and a capacitor C1 connected in series, thereby controlling the cut-off frequency of the differential current signal output by the PD array by adjusting the values of R1 and C1, so that a direct-current optical signal entering the low-bandwidth amplifier TIA can be eliminated, so as to realize the low-frequency filtering to the differential current signal. It should be noted that the cut-off frequency can be adjusted according to the actual use bandwidth of the coherent receiving device.

Figure 5:
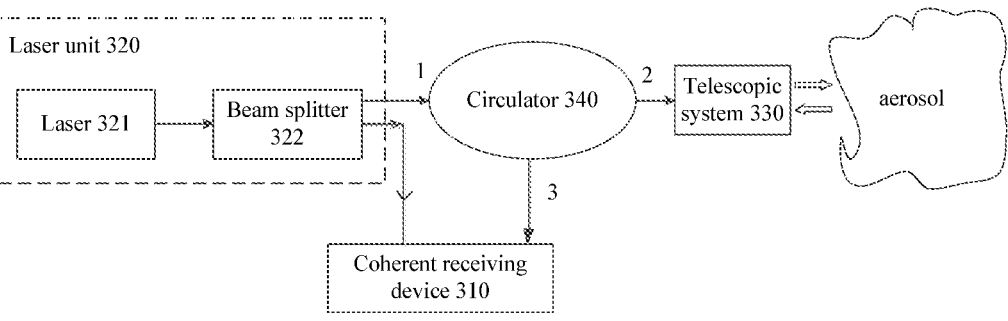
FIG. 5 is a structural schematic diagram of an anemometry lidar system provided by an embodiment of the present disclosure.

FIG. 5 is a structural schematic diagram of an anemometry lidar system provided by an embodiment of the present disclosure. As shown in FIG. 5, the anemometry lidar system comprises: a coherent receiving device 310, a laser unit 320 and a telescopic system 330, wherein the laser unit 320 is used for emitting a laser, and splitting the laser into a first part of the laser and a second part of the laser, outputting the first part of the laser to the telescopic system 330, and outputting the second part of the laser to the coherent receiving device 310;

the telescopic system 330 is used for emitting the first part of the laser into an atmosphere, receiving an echo signal of the first part of the laser interacting with aerosol molecules in the atmosphere, and outputting the echo signal to the coherent receiving device 310; and the coherent receiving device 310 is used for receiving the second part of the laser as local oscillation light, interfering the local oscillation light with the echo signal to form a demodulation signal, obtaining a Doppler frequency shift amount of the echo signal through the demodulation signal, and determining a wind speed according to the Doppler frequency shift amount.

In an embodiment of the present disclosure, the laser unit 320 comprises a laser 321 and a beam splitter 322, wherein the laser device 321 is used for emitting laser, and the beam splitter 322 is used for splitting the laser into a first part of the laser with first energy and a second part of the laser with second energy, where the first energy is smaller than the second energy. In some embodiments, the laser generated by the laser device 321 is split through the beam splitter 322 according to a certain proportion, for example, 9:1, and thus, 90% of the laser is output to the coherent receiving device 310 as the local oscillation light, and 10% of the laser is emitted into the atmosphere through the telescopic system 330, so that the laser interacts with aerosol molecules in the atmosphere to generate an echo signal which is received and output, as the signal light, to the coherent receiving device 310 by the telescopic system 330. In a practical application, the laser device 321 may be a single-polarization narrow linewidth light source. Preferably, the light emission wavelength is 1.55 um.

Figure 6:
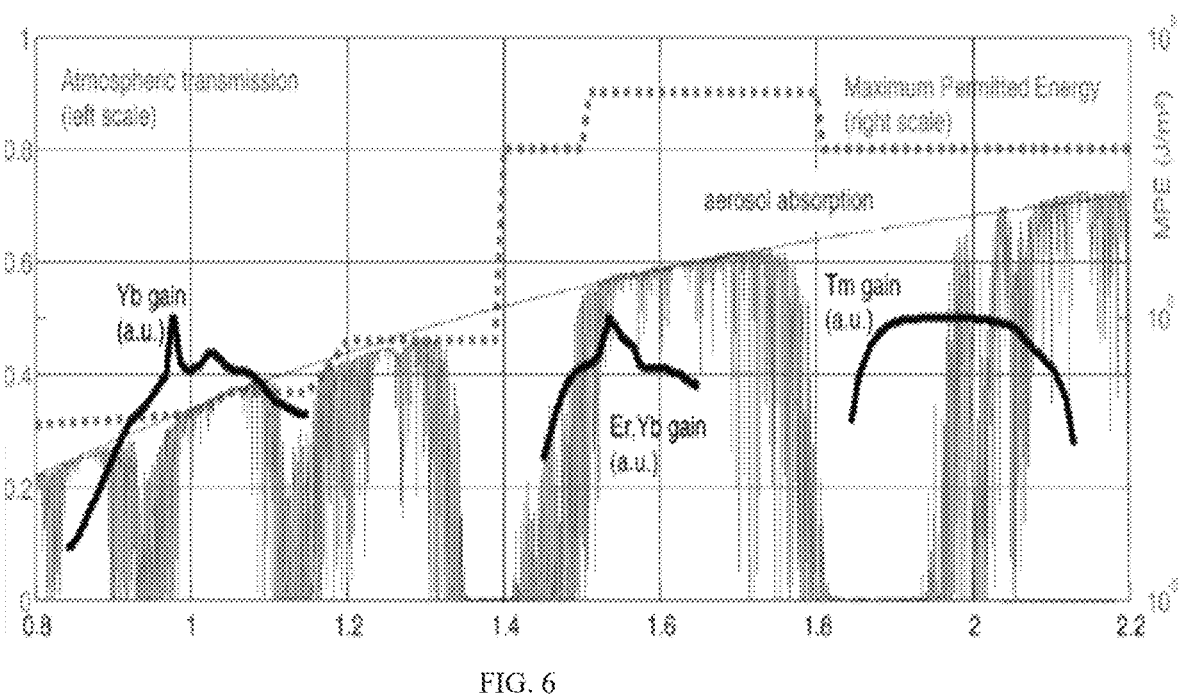
FIG. 6 is a curve graph of an atmospheric transmission window and a human eye injury threshold.

FIG. 6 is a curve graph of an atmospheric transmission window and a human eye injury threshold, where the abscissa in FIG. 6 is a beam wavelength (μm), MPE is a maximum exposure dose of human eyes, and a dotted line is a safety curve of human eyes for light beam intensity. It can be known from the dotted line that the laser with a wavelength of 1.5-1.8 μm has a higher safety threshold for human eyes. The maximum allowable exposure dose of the laser with a wavelength of 1.55 μm is 10 times that of the laser with a wavelength of 2.1 μm, which is five orders of magnitude higher than that the laser with a wavelength of 1.06 μm. Moreover, the laser with a wavelength of 1.55 μm is relatively commonly used, and a beam splitter and a circulator with a wavelength of 1.55 μm are relatively common; therefore, the anemometry lidar system in the embodiments of the present disclosure selects a laser with a wavelength of 1.55 um; that is, it can be compatible with a wavelength range of an existing standard device, and has a high safety threshold for human eyes.

In an embodiment of the present disclosure, the anemometry lidar system further comprises a circulator 340 located between the laser unit 320 and the telescopic system 330. The beam splitter 322 splits the laser into a first part of the laser with first energy and a second part of the laser with second energy, then outputs the first part of the laser to a port 1 of the circulator 340, then the first part of the laser is output to the telescopic system 330 from a port 2 of the circulator 340, and then the telescopic system 330 emits the first part of laser into the atmosphere. Next, the first part of laser interacts with aerosol molecules in the atmosphere (e.g. elastic scattering), then the backscattered echo signal is received by the telescopic system 330 and output to the port 2 of the circulator 340, and then the echo signal is output from a port 3 of the circulator 340 to the coherent receiving device 310. The telescopic system 330 may be a laser collimation system. The laser collimation system can collimate the small-mode-field divergent light source in the circulator 340 into a large-mode-field parallel light beam, so that it can be transmitted a longer distance.

In an embodiment of the present disclosure, the laser device emits a laser with a center wavelength of λ into the atmosphere. Since the aerosol molecules suspended in the atmosphere moving along with wind have a scattering effect for the laser, assuming that the component of a wind speed V in the view direction of the telescopic system is V×cos(θ), the backscattered optical signal received by the anemometry lidar system generates a Doppler frequency shift Δf in direct proportion to the radial movement speed of the aerosol molecules, and the formula of the Doppler frequency shift Δf is as follows:

$$\Delta f = \pm \frac{2V \times \cos(\theta)}{\lambda} \quad (1)$$

where ± represents a radial movement direction of the aerosol molecules. Therefore, the radial wind speed of aerosol molecules can be obtained according to the Doppler frequency shift by determining the Doppler frequency shift of the backscattered optical signal received by the wind lidar system.

The frequency mixer comprises a first sub-frequency mixer and a second sub-frequency mixer, and the first sub-frequency mixer and the second sub-frequency mixer respectively mix two orthogonal polarization states of the signal light (the first signal light and the second signal light) with the local oscillation light so as to realize a frequency shift demodulation of the signal light. Assuming that the electric field of the signal light is $E_{in}$, and the electric field of the local oscillation light is $E_{LO}$, the formulas of the signal light electric field $E_{in}$ and the local oscillation light electric field $E_{lo}$ are as follows:

$$E_{in} = \sqrt{P_{in}} \times e^{j(\omega_{in} \times t + \theta_{in})} \quad (2)$$

$$E_{lo} = P_{lo} \times e^{j(\omega_{lo} \times t + \theta_{lo})} \quad (3)$$

where $P_{in}$ is an optical intensity of the signal light, $P_{lo}$ an optical intensity of the local oscillation light; $\omega_{in}$ is an angle frequency of the signal light, $\omega_{lo}$ is an angle frequency of the local oscillation light; $\theta_{in}$ is an initial phase of the signal light, and $\theta_{lo}$ is an initial phase of the local oscillation light.

When the signal light passes through the polarization beam splitter, an intersection angle between the two light polarization state (the s polarization state and the p polarization state) of the signal light and the horizontal direction (a plane composed of an incident direction and a normal line) is set as δ, then a light intensity formula can be obtained according to the Marius's law, and thus the formula of the light intensity $P_p$ of the first signal light in the p polarization state and the light intensity $P_s$ of the second signal light in the s polarization state are as follows:

$$P_p = P_{in} \times (\cos \delta)^2 \quad (4)$$

$$P_s = P_{in} \times (\sin \delta)^2 \quad (5)$$

Figure 7:
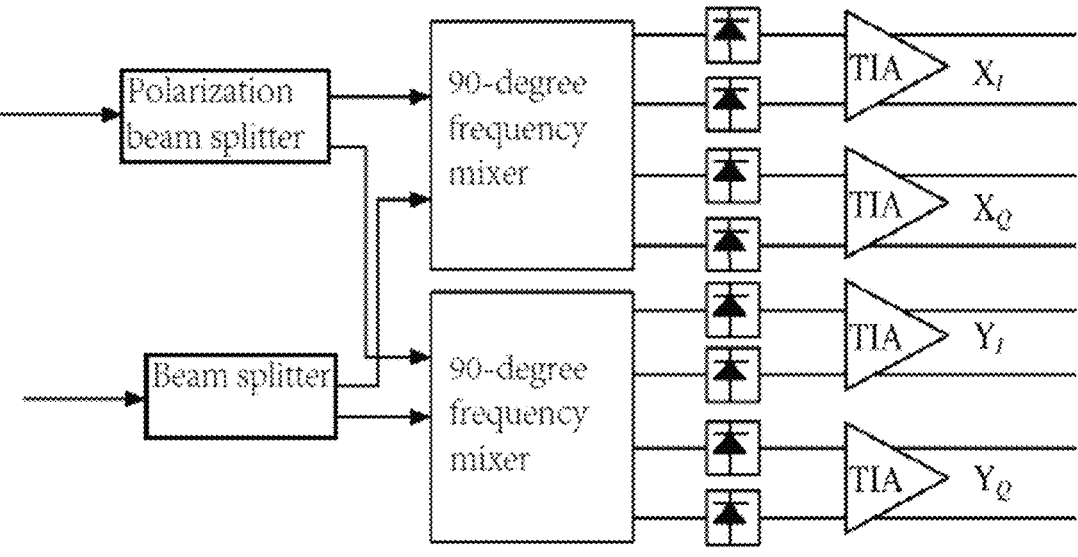
FIG. 7 is a circuit schematic diagram of a coherent receiving device provided by an embodiment of the present disclosure.
Figure 8:
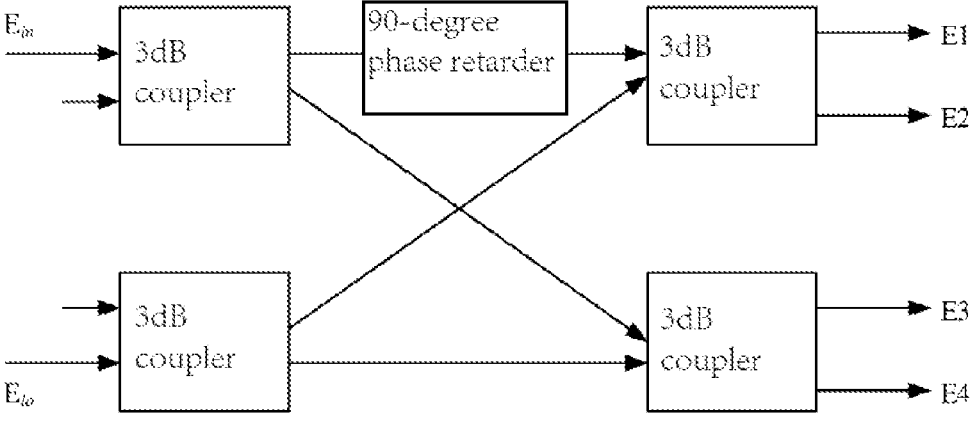
FIG. 8 is a structural schematic diagram of a 90-degree frequency mixer provided by an embodiment of the present disclosure.
Figure 9:
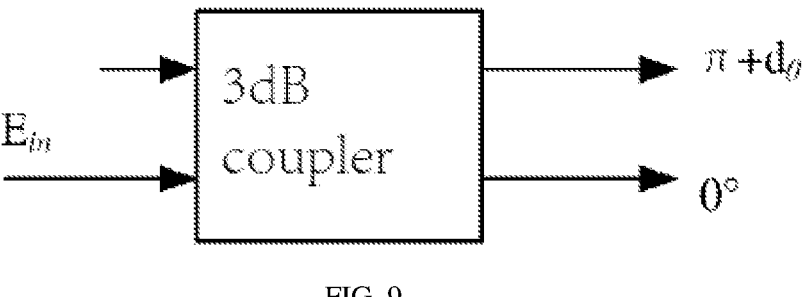
FIG. 9 is a schematic diagram of a port phase difference of a 3 dB coupler provided by an embodiment of the present disclosure.

FIG. 7 is a circuit schematic diagram of a coherent receiving device provided by an embodiment of the present disclosure. As shown in FIG. 6, the signal light is split by a polarization beam splitter into first signal light with a p polarization state and second signal light with an s polarization state, the polarization beam splitter outputs the first signal light and the second signal light to the first sub-frequency mixer (a 90-degree frequency mixer) and the second sub-frequency mixer (a 90-degree frequency mixer), respectively; and the local oscillation light is split into two beams of the same local oscillation light through the beam splitter and output to the first sub-frequency mixer (a 90-degree frequency mixer) and the second sub-frequency mixer (a 90-degree frequency mixer), respectively. FIG. 8 is a structural schematic diagram of a 90-degree frequency mixer provided by an embodiment of the present disclosure. As shown in FIG. 8, a single 90-degree frequency mixer comprises four 3 dB couplers and a 90-degree phase retarder. The phase retarder is a section of additional waveguide whose length is equal to one quarter of the laser wavelength, and it is capable of generating a phase shift of 90-degrees. The local oscillation light is split into two beams of the same local oscillation light through the beam splitter, then the light intensity of the local oscillation light entering a single 90-degree frequency mixer is $P_{lo}/2$. FIG. 9 is a schematic diagram of a port phase difference of a 3 dB coupler provided by an embodiment of the present disclosure. As shown in FIG. 9, one port of the 3 dB coupler outputs light with a phase of $\pi + d_\theta$, and the other port outputs light with a phase of 0°. For the first signal light with the p polarization state, the formulas of an electric field of the mixed light output after the first signal light and the local oscillation light are mixed by the first sub-frequency mixer (a 90-degree frequency mixer) is as follows:

$$E_1 = \frac{1}{2}\sqrt{P_p} \times e^{j(\omega_{in} \times t + \theta_{in} + \frac{\pi}{2} + d_\varphi)} + \frac{1}{2}\sqrt{\frac{P_{lo}}{2}} \times e^{j(\omega_{lo} \times t + \theta_{lo} + \pi + 2 \times d_\theta)} \quad (6)$$

$$E_2 = \frac{1}{2}\sqrt{P_p} \times e^{j\omega_{in} \times t + \theta_{in} + \pi + d_\theta + d_\varphi)} + \frac{1}{2}\sqrt{\frac{P_{lo}}{2}} \times e^{j(\omega_{lo} \times t + \theta_{lo} + \frac{\pi}{2} + d_\theta)} \quad (7)$$

$$E_3 = \frac{1}{2}\sqrt{P_p} \times e^{j(\omega_{in} \times t + \theta_{in} + \frac{\pi}{2} + d_\theta)} + \frac{1}{2}\sqrt{\frac{P_{lo}}{2}} \times e^{j(\omega_{lo} \times t + \theta_{lo} + \frac{\pi}{2} + d_\theta)} \quad (8)$$

$$E_4 = \frac{1}{2}\sqrt{P_p} \times e^{j(\omega_{in} \times t + \theta_{in} + \pi + 2 \times d_\theta)} + \frac{1}{2}\sqrt{\frac{P_{lo}}{2}} \times e^{j(\omega_{lo} \times t + \theta_{lo})} \quad (9)$$

The trans-impedance gain of the amplifier module (TIA) is set as G, and the responsivity of photodiodes in the PD array is set as R, then the differential current output by the PD array is amplified and transformed into a differential voltage and the formula of the differential voltage output is as follows:

$$X_I = R \times G \times (|E_1|^2 - |E_2|^2) \tag{10}$$

It can be obtained through substituting formulas (6) and (7) into formula (10):

$$X_I = R \times G \times \sqrt{\frac{P_p \times P_{lo}}{2}} \cos((\omega_{in} - \omega_{lo}) \times t + \theta_{in} - \theta_{lo} - d_\theta - d_\varphi) \tag{11}$$

$$X_Q = R \times G \times (|E_3|^2 - |E_4|^2) \tag{12}$$

It can be obtained through substituting formulas (8) and (9) into formula (12):

$$X_Q = R \times G \times \sqrt{\frac{P_p \times P_{lo}}{2}} \sin((\omega_{in} - \omega_{lo}) \times t + \theta_{in} - \theta_{lo} + d_\theta) \tag{13}$$

where $d_\varphi$ is a phase error of the 90-degree phase retarder, and $d_\varphi$ has a wavelength correlation which is about −0.045 (°/nm) for a frequency mixer with planar optical waveguide; $d_\theta$ is a phase error between the two output ports of the 3 dB coupler, and similarly, $d_\theta$ has a wavelength correlation of about −0.021 (°/nm). What is used in the embodiment of the present disclosure is a single-wavelength laser, therefore, $d_\varphi$ and $d_\theta$ does not have wavelength correlation in the embodiment of the present disclosure, so that $d_\varphi$=0 and $d_\theta$=0. In this case, the formulas of the differential voltages $X_I$ and $X_Q$ are as follows:

$$X_I = R \times G \times \sqrt{\frac{P_p \times P_{lo}}{2}} \cos((\omega_{in} - \omega_{lo}) \times t + \theta_{in} - \theta_{lo}) \tag{14}$$

$$X_Q = R \times G \times \sqrt{\frac{P_p \times P_{lo}}{2}} \sin((\omega_{in} - \omega_{lo}) \times t + \theta_{in} - \theta_{lo}) \tag{15}$$

It can be seen from the formula (14) and the formula (15) that the differential voltage signals $X_I$ and $X_Q$ both contain an item $$\sqrt{\frac{P_s \times P_{lo}}{2}},$$

that is to say, in the embodiment of the present disclosure, the amplitude of the output current is improved by introducing the local oscillation light in the coherent receiving device, so that the detection sensitivity of the system is improved. Moreover, the differential voltage signals $X_I$ and $X_Q$ both comprise a part of the frequency difference between the signal light and the local oscillation light, i.e., $(\omega_{in} - \omega_{lo}) \times t$, and therefore, the Doppler frequency shift amount of the signal light can be obtained by performing frequency detection on the differential voltage signals $X_I$ and $X_Q$, and the inversion of the wind speed can be realized by using formula (1).

For the second signal light with the s polarization state, the formula of the electric field intensity of the mixed light which is mixed for the second signal light and the local oscillation light by the second sub-frequency mixer (90-degree frequency mixer) and output from the same, is as follows:

$$E_1 = \frac{1}{2}\sqrt{P_s} \times e^{j(\omega_{in} \times t + \theta_{in} + \frac{\pi}{2} + d_\varphi)} + \frac{1}{2}\sqrt{\frac{P_{lo}}{2}} \times e^{j(\omega_{lo} \times t + \theta_{lo} + \pi + 2 \times d_\theta)} \tag{16}$$

$$E_2 = \frac{1}{2}\sqrt{P_s} \times e^{j(\omega_{in} \times t + \theta_{in} + \pi + d_\theta + d_\varphi)} + \frac{1}{2}\sqrt{\frac{P_{lo}}{2}} \times e^{j(\omega_{lo} \times t + \theta_{lo} + \frac{\pi}{2} + d_\theta)} \tag{17}$$

$$E_3 = \frac{1}{2}\sqrt{P_S} \times e^{j(\omega_{in} \times t + \theta_{in} + \frac{\pi}{2} + d_\theta)} + \frac{1}{2}\sqrt{\frac{P_{lo}}{2}} \times e^{j(\omega_{lo} \times t + \theta_{lo} + \frac{\pi}{2} + d_\theta)} \tag{18}$$

$$E_4 = \frac{1}{2}\sqrt{P_S} \times e^{j(\omega_{in} \times t + \theta_{in} + \pi + 2 \times d_\theta)} + \frac{1}{2}\sqrt{\frac{P_{lo}}{2}} \times e^{j(\omega_{lo} \times t + \theta_{lo})} \tag{19}$$

The trans-impedance gain of the amplifier module (TIA) is set as G, and the responsivity of the photodiodes in the PD array is set as R, then the formula of the differential voltage output through the amplification and conversion by TIA for the differential current output by PD array, is as follows:

$$Y_I = R \times G \times (|E_1|^2 - |E_2|^2) \tag{20}$$

It can be obtained through substituting formulas (16) and (17) into formula (20):

$$Y_I = R \times G \times \sqrt{\frac{P_s \times P_{lo}}{2}} \cos((\omega_{in} - \omega_{lo}) \times t + \theta_{in} - \theta_{lo} - d_\theta - d_\varphi) \tag{21}$$

$$Y_Q = R \times G \times (|E_3|^2 - |E_4|^2) \tag{22}$$

It can be obtained through substituting formulas (18) and (19) into formula (22):

$$Y_Q = R \times G \times \sqrt{\frac{P_s \times P_{lo}}{2}} \sin((\omega_{in} - \omega_{lo}) \times t + \theta_{in} - \theta_{lo} + d_\theta) \tag{23}$$

where $d_\varphi$ is a phase error of the 90-degree phase retarder, and has a wavelength correlation, which is about −0.045 (°/nm) for a frequency mixer with planar optical waveguide; and $d_\theta$ is a phase error between the two output ports of the 3 dB coupler, similarly, $d_\theta$ has a wavelength correlation, which is about −0.021 (°/nm). What is used in the embodiment of the present disclosure is a single-wavelength laser, and thus, $d_\varphi$ and $d_\theta$ do not have wavelength correlation in the embodiment of the present disclosure, so that $d_\varphi$=0 and $d_\theta$=0. In this case, the formulas of the differential voltages $Y_I$ and $Y_Q$ is as follows:

$$Y_I = R \times G \times \sqrt{\frac{P_s \times P_{lo}}{2}} \cos((\omega_{in} - \omega_{lo}) \times t + \theta_{in} - \theta_{lo}) \tag{24}$$

$$Y_Q = R \times G \times \sqrt{\frac{P_s \times P_{lo}}{2}} \sin((\omega_{in} - \omega_{lo}) \times t + \theta_{in} - \theta_{lo}) \tag{25}$$

It can be seen from the formula (24) and the formula (25) that the differential voltage signals $Y_I$ and $Y_Q$ both contain an item $$\sqrt{\frac{P_s \times P_{lo}}{2}},$$

that is to say, in the embodiment of the present disclosure, the amplitude of the output current is improved by introducing the local oscillation light in the coherent receiving device, so that the sensitivity of system detection is improved. Moreover, the differential voltage signals $Y_I$ and $Y_Q$ comprise a part of the frequency difference between the signal light and the local oscillation light, i.e., $(\omega_{in}-\omega_{lo}) \times t$, and therefore, the Doppler frequency shift amount of the signal light can be obtained by performing frequency detection on the differential voltage signals $Y_I$ and $Y_Q$, and inversion of the wind speed can be realized by using formula (1).

Embodiments of the present disclosure provide a coherent receiving device and an anemometry lidar system. The device comprises: a polarization maintaining optical fiber pin, a polarization beam splitting prism, a frequency mixer, a photodiode PD array and a signal processing circuit, wherein the polarization maintaining optical fiber pin is used for receiving local oscillation light and outputting the local oscillation light to the frequency mixer, and a polarization state of the local oscillation light is kept unchanged when the local polarization light is transmitted in the polarization maintaining optical fiber pin; the polarization beam splitting prism is used for receiving a signal light, splitting the signal light into first signal light with a p polarization state and second signal light with an s polarization state, and outputting the first signal light and the second signal light to the frequency mixer; the frequency mixer is used for mixing the first signal light with the local oscillation light, and mixing the second signal light with the local oscillation light, and outputting the mixed light to the PD array; the PD array is used for performing photoelectric conversion on the mixed light to obtain a differential current signal; the signal processing circuit is used for converting the differential current signal so as to obtain a differential voltage signal; the derivation formula of the differential voltage signal comprising a part of a frequency difference between the signal light and the local oscillation light, detecting a frequency of the differential voltage signal so as to obtain a value of the frequency difference between the signal light and the local oscillation light; and obtaining a Doppler frequency shift amount of the signal light according to the value of the frequency difference between the signal light and the local oscillation light. The coherent receiving device in the embodiments of the present disclosure performs the Doppler frequency detection by using the interference between the local oscillation light and the signal light, and uses a differential-signal output mode, which is capable of eliminating the system common-mode noise and improving the detection precision, and moreover, the Doppler frequency shift detection is not affected by a laser wavelength drift, and the coherent receiving device uses a dual-polarization detection scheme. Therefore, even if the signal light changes the polarization direction, the Doppler frequency shift of the signal light can be effectively detected.

It can be understood that these embodiments described herein may be implemented in hardware, software, firmware, middleware, microcode, or a combination thereof. For a hardware implementation, a processing unit may be implemented in one or more application specific integrated circuits (ASIC), digital signal processors (DSP), digital signal processing devices (DSP Device, DSPD), programmable logic devices (PLD), field programmable gate arrays (FPGA), general-purpose processors, controllers, microcontrollers, microprocessors, other electronic units for executing the functions described herein, or combinations thereof.

It should be understood that "one embodiment" or "an embodiment" mentioned throughout the description means that a particular feature, structure, or characteristic related to the present disclosure is included in at least one embodiment of the present disclosure. Thus, "in one embodiment" or "in an embodiment" in various places throughout the description does not necessarily refer to the same embodiment. Furthermore, these particular features, structures, or characteristics may be combined in any suitable manner in one or more embodiments. It should be understood that in various embodiments of the present disclosure, the size of the serial numbers of the above-mentioned processes does not mean the sequence of execution, and the execution sequence of each process should be determined by the function and the internal logic thereof, and should not constitute any limitation on the implementation process of the embodiments of the present disclosure. The above-mentioned serial numbers of the embodiments of the present disclosure are only for description, and do not represent the advantages or disadvantages of the embodiments.

In the several embodiments provided in the present disclosure, it should be understood that the disclosed method and device may be implemented in other modes. The device embodiments described above are merely schematic; for example, the division of the units is merely a logical function division, and there may be another division mode in actual implementation, e.g. multiple units or components may be combined, or may be integrated into another system, or some features may be ignored or not executed. In addition, the coupling, or direct coupling, or communication connection between the various components shown or discussed may be through some interfaces, and the indirect coupling or communication connection of devices or units may be electrical, mechanical or other forms.

The unit described above as a separate component may or may not be physically separated, and the component displayed as a unit may or may not be a physical unit, that is, it may be located in one place or distributed to multiple network units; and some or all of the units may be selected according to actual needs to realize the purpose of the solutions of the present embodiments.

In addition, each functional unit in each embodiment of the present disclosure may all be integrated into one processing module, or each unit may be separately used as a unit, or two or more units may be integrated into one unit; the above-mentioned integrated unit may be implemented in a form of hardware, or may be implemented in a form of hardware plus software functional units. Those ordinary skilled in the art may understand that all or a portion of the steps of implementing the above-mentioned method embodiments may be completed by means of hardware related to a program instruction, and the aforementioned program may be stored in a computer-readable storage medium, and when the program is executed, the steps of the above-mentioned method embodiments are executed; and the aforementioned storage medium includes various media that may store program codes, such as a removable storage device, a read-only memory (ROM), a random access memory (RAM), a magnetic disk, or an optical disk, and the like.

The methods disclosed in the several method embodiments provided in the present disclosure can be arbitrarily combined under the condition of no conflict to obtain new method embodiments.

The features disclosed in several systems or product embodiments provided in the present disclosure may be arbitrarily combined without conflict to obtain new system embodiments or device embodiments.

The above description is only specific embodiments of the present disclosure, however, the protection scope of the present disclosure is not limited to it, and any person skilled in the art can easily think of changes or substitutions within the technical scope as disclosed by the present disclosure, and which should be included within the protection scope of the present disclosure. Therefore, the protection scope of the present disclosure should be subject to the protection scope of the present disclosure.

What is claimed is:

1. A coherent receiving device, comprising a polarization maintaining optical fiber pin, a polarization beam splitting prism, a frequency mixer, a photodiode (PD) array and a signal processing circuit, wherein the polarization maintaining optical fiber pin is configured to receive local oscillation light and output the local oscillation light to the frequency mixer, a polarization state of the local oscillation light being kept unchanged when the local oscillation light is transmitted in the polarization maintaining optical fiber pin;

the polarization beam splitting prism is configured to receive signal light, splitting the signal light into a first signal light with a p polarization state and a second signal light with an s polarization state, and outputting the first signal light and the second signal light to the frequency mixer;

the frequency mixer is configured to mix the first signal light and the second signal light with the local oscillation light, respectively, and output mixed light to the PD array;

the PD array is configured to perform photoelectric conversion on the mixed light to obtain a differential current signal; and the signal processing circuit is configured to convert the differential current signal so as to obtain a differential voltage signal, wherein a derivation formula of the differential voltage signal comprises a part of a frequency difference between the signal light and the local oscillation light; detect a frequency of the differential voltage signal so as to obtain a value of the frequency difference between the signal light and the local oscillation light; and obtain a Doppler frequency shift amount of the signal light according to the value of the frequency difference between the signal light and the local oscillation light, wherein the coherent receiving device further comprises two C lenses provided between the polarization beam splitting prism and the frequency mixer, wherein the first signal light and the second signal light output by the polarization beam splitting prism are respectively converged into the frequency mixer through the two C lenses.

2. The coherent receiving device of claim 1, wherein the signal processing circuit comprises an amplifier module, an analog-to-digital converter, and a processor;

wherein the amplifier module is configured to amplify the differential current signal and convert the differential current signal into the differential voltage signal;

the analog-to-digital converter is configured to perform analog-to-digital converter ADC sampling on the differential voltage signal to obtain an ADC sampling signal; and the processor is configured to process the ADC sampling signal to obtain a frequency of the ADC sampling signal which is the Doppler frequency shift amount of the signal light.

3. The coherent receiving device of claim 2, wherein the derivation formula of the differential voltage signal is $$X_I = R \times G \times \sqrt{\frac{P_{in} \times (\cos\delta)^2 \times P_{lo}}{2}} \cos((\omega_{in} - \omega_{lo}) \times t + \theta_{in} - \theta_{lo}) \text{ and}$$

$$X_Q = R \times G \times \sqrt{\frac{P_{in} \times (\cos\delta)^2 \times P_{lo}}{2}} \sin((\omega_{in} - \omega_{lo}) \times t + \theta_{in} - \theta_{lo});$$

where R is responsivity of photodiode in the PD array; G is a trans-impedance gain of the amplifier module; $P_{in}$ is an optical intensity of the signal light; $P_{lo}$ is an optical intensity of the local oscillation light; $\omega_{in}$ is an angle frequency of the signal light; $\omega_{lo}$ is an angle frequency of the local oscillation light; $\theta_{in}$ is an initial phase of the signal light; $\theta_{lo}$ is an initial phase of the local oscillation light; $\delta$ is an intersection angle between the first signal light and the second signal light and a horizontal direction;

the frequency of the differential voltage signal is detected to determine a value of item $(\omega_{in} - \omega_{lo}) \times t$ in the derivation formula of the differential voltage signal; and the value of item $(\omega_{in} - \omega_{lo}) \times t$ in the derivation formula of the differential voltage signal is taken as the Doppler frequency shift amount of the signal light.

4. The coherent receiving device of claim 2, wherein the amplifier module uses a low-bandwidth amplifier, and is also configured to realize high-frequency filtering to the differential current signal.

5. The coherent receiving device of claim 2, wherein the Doppler frequency shift amount of the signal light is configured to determine a wind speed.

6. The coherent receiving device of claim 2, wherein the device further comprises a low-frequency filter circuit provided between the PD array and the amplifier module, wherein the low-frequency filter circuit is configured to control a cut-off frequency of the differential current signal so as to realize low-frequency filtering to the differential current signal.

7. The coherent receiving device of claim 1, wherein the signal light is generated in a following mode: a laser emitted by a laser device enters an atmosphere and interacts with aerosol molecules in the atmosphere to generate an echo signal, and the echo signal is the signal light.

8. The coherent receiving device of claim 7, wherein the local oscillation light is the laser which enters into the polarization maintaining optical fiber pin and is emitted by the laser device.

9. The coherent receiving device of claim 1, wherein the frequency mixer comprises a first sub-frequency mixer and a second sub-frequency mixer, wherein the first sub-frequency mixer is configured to mix the first signal light and the local oscillation light; and the second sub-frequency mixer is configured to mix the second signal light and the local oscillation light.

10. The coherent receiving device of claim 1, wherein the device further comprises a reflecting prism and a lens array which are provided between the frequency mixer and the PD array, wherein the mixed light output by the frequency mixer is reflected by the reflecting prism and converged by the lens array, and then output to the PD array.

11. An anemometry lidar system, comprising a coherent receiving device according to claim 1, a laser unit and a telescopic system;

wherein the laser unit is configured to emit a laser, split the laser into a first part of the laser and a second part of the laser, output the first part of the laser to the telescopic system, and output the second part of the laser to the coherent receiving device;

the telescopic system is configured to emit the first part of the laser into an atmosphere, receive an echo signal which is produce by the first part of the laser interacting with aerosol molecules in the atmosphere, and output the echo signal to the coherent receiving device; and the coherent receiving device is configured to receive the second part of the laser as local oscillation light, interfere the local oscillation light with the echo signal to form a demodulation signal, obtain a Doppler frequency shift amount of the echo signal through the demodulation signal, and determine a wind speed according to the Doppler frequency shift amount.

12. The anemometry lidar system of claim 11, wherein the laser unit comprises a laser device and a beam splitter;

wherein the laser device is configured to emit a laser; and the beam splitter is configured to split the laser into a first part of the laser with a first energy and a second part of the laser with a second energy, wherein the first energy is smaller than the second energy.

\* \* \* \* \*